F. J. P. KUHLMANN.
THERMOSTAT.
APPLICATION FILED OCT. 14, 1912.
1,109,996.
Patented Sept. 8, 1914.
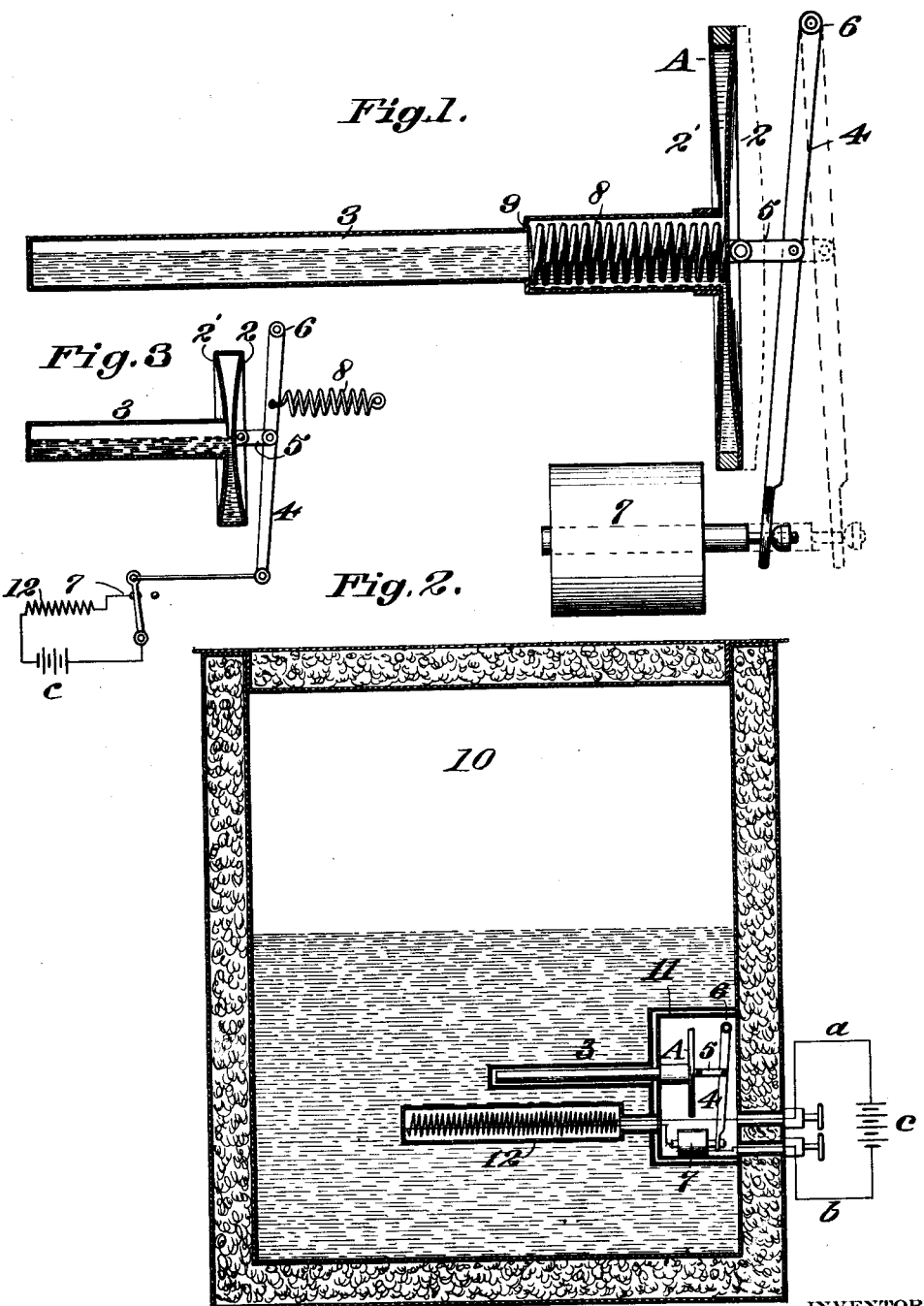
WITNESSES:
INVENTOR
Frederick J. P. Kuhlmann
BY G. H. Strong
ATTORNEY

UNITED STATES PATENT OFFICE.

FREDERICK J. P. KUHLMANN, OF SAN FRANCISCO, CALIFORNIA, ASSIGNOR TO ECONOMY ELECTRIC MANUFACTURING COMPANY, OF SAN FRANCISCO, CALIFORNIA, A CORPORATION OF CALIFORNIA.

THERMOSTAT.

1,109,996.  Specification of Letters Patent.  Patented Sept. 8, 1914.

Application filed October 14, 1912. Serial No. 725,655.

*To all whom it may concern:*

Be it known that I, FREDERICK J. P. KUHLMANN, a citizen of the United States, residing at the city and county of San Francisco and State of California, have invented new and useful Improvements in Thermostats, of which the following is a specification.

This invention relates to a thermostat.

It is the object of this invention to provide a thermostat capable of exerting a powerful action, and which is especially adapted for use in actuating switches, valves, and the like, requiring considerable power in their operation.

A further object is to provide a thermostat which is so constructed as to automatically operate to open a switch or valve in event the thermostat becomes damaged and incapable of expanding under the action of heat.

The invention resides in forming an expansible chamber with a flexible diaphragm, partially filling the expansible chamber with a liquid capable of boiling at a temperature at which the thermostat is desired to operate a switch or valve, forming a vacuum in the expansible chamber in the space therein not occupied by the liquid, so that the pressure of the atmosphere will act to normally retain the diaphragm in its innermost position, and providing a spring which will be put under compression by the pressure of the air on the diaphragm and which acts, when the vacuum in the expansible chamber is broken, to rock a lever connected to the diaphragm.

The invention further consists of the parts and the construction and combination of parts as hereinafter more fully described and claimed, having reference to the accompanying drawings, in which—

Figure 1 is a longitudinal section of the invention. Fig. 2 is a view of the invention in elevation, showing it as applied to a liquid containing tank. Fig. 3 is a vertical section partly in elevation of a modified form of the invention.

In the drawings A represents a thermostat expansible chamber having the usual flexible diaphragms 2 and 2' connected at their edges. Mounted on the diaphragm 2' is a tube 3 which is closed at its outer end and opens to the space between the diaphragms 2 and 2'. The tube 3 and the space between the diaphragms 2 and 2' is designed to be partially filled with a suitable liquid, the boiling point of which determines the maximum temperature at which the thermostat is to be operated. Various fluids are employed according to the temperature at which the thermostat is required to operate. A vacuum is created in the tube 3 and the expansible chamber A in the space not occupied by the liquid, thus causing atmospheric pressure on the diaphragms 2 and 2' to compress the latter into their innermost positions, as shown in full lines in Fig. 1. Diaphragm 2 is connected to a lever 4 of any suitable description, by means of a link 5 or in any other desired manner, which lever is fulcrumed at 6, and has its outer end connected to a cut-off switch 7 of any suitable description.

A spring 8 is provided for opposing the inward movement of the diaphragms 2 and 2', and which spring is adapted to be compressed by the pressure of the atmosphere on the diaphragms. This spring 8 may be an expansible helical spring and mounted within the tube 3 so as to bear between a shoulder 9 on the tube, and the inner face of the diaphragm 2, as shown in Fig. 1, to normally exert an outward pressure on the diaphragm 2; or, it may be a tension spring and connected to the lever 4, as shown in Fig. 3, to normally exert an outward pull on the diaphragm 2. The purpose of the spring 8 is to accelerate the outward movement of the diaphragms 2 and 2' when the vacuum within the tube 3 and the expansible chamber A is broken, and to render the outward movement of the diaphragms 2 and 2' more powerful and effective.

This invention is particularly applicable for use in connection with heating tanks 10, in controlling the heating agent so as to maintain a liquid in the tank 10 at a certain temperature. In its application the invention is placed within a chamber 11 in the tank 10, with the tube 3 extending into the liquid within the tank and the lever 4 connecting with the switch 7 controlling the flow of an electric current through a heating coil 12, of any suitable description disposed in the fluid within the tank 10. The switch 7 is of the ordinary cut-off type and controls the flow of current through conductors $a$ and $b$ from any suitable source of electrical supply $c$. The switch 7 is connected to the lever 4 with such relation to the thermostat as to be closed when the latter is in its normal condition, thus allowing a flow of current through the heating coils 12, whereby the temperature in the tank 10 is increased to the desired degree.

In the operation of the invention when the temperature of the liquid in the tank 10 has reached a point sufficient to heat the liquid in the tube 3 and expansible chamber A to boiling, the latter vaporizes, thereby breaking the vacuum within the tube 3 and the expansible chamber A. This causes the diaphragms 2 and 2' to return to their normal position, as indicated in dotted lines in Fig. 1, by reason of the pressure between the diaphragms 2 and 2' being equal that of the atmosphere exterior thereof. The outward movement of the diaphragms 2 and 2' is accelerated and rendered more powerful by the action of the spring 8, which acts to quickly restore the diaphragms to their normal expanded position with relation to each other, the moment the vacuum within the tube 3 and expansible chamber A is reduced.

The tension of the spring 8 is designed to be proportional to the degree of vacuum formed in the tube 3 and expansible chamber A, so as to be caused to be sufficiently tensioned by the pressure of the air on the diaphragms 2 and 2' that when this tension is released by the breaking of the vacuum, the spring will have sufficient power to restore the diaphragms 2 and 2' to their expanded position and rock the lever 4 with such force as to actuate the switch 7, thereby cutting off the flow of electric current to the heating coil 12. As the liquid in the tank 10 cools, after cutting out the heating coil 12, the temperature of the tube 3 will be correspondingly reduced, thereby causing the vapors within the tube 3 and expansible chamber A to become condensed and restored to their liquid form, thus restoring the vacuum and allowing the diaphragms 2 and 2' to be compressed by atmospheric pressure to rock the lever 4 and throw the switch 7 to reëstablish a current through the heating coil 12. If the vacuum in the tube 3 and expansible chamber A becomes destroyed or removed in any way other than that previously described, such, for instance, as the breaking or perforating of the tube 3 or expansible chamber A, the spring 8 will expand instantly, thereby throwing out the switch 7 and thus breaking the electric circuit to the heating coil 12. The function of the spring 8 in this instance is to automatically throw out the switch 7 should the thermostat be rendered inoperative by the breaking of the vacuum within the tube 3 and expansible chamber A.

By thus constructing the thermostat the mere expansion of a liquid is not depended upon for its operation. It is manifest that the thermostat is adapted for use in any place wherein the heat is sufficient to bring the liquid therein to a boiling point, and that it may be employed for operating any desired mechanism.

Having thus described my invention, what I claim and desire to secure by Letters Patent, is—

1. In a thermostat, a pair of flexible disks connected to form an expansible chamber, a horizontal tube closed at its outer end and having its inner end open and rigidly connected to one of the disks at the center of the latter so as to communicate with the interior of the chamber, a shoulder on the interior of the tube intermediate the ends of the latter, a coil spring on the interior of the tube abutting the shoulder at one end and having its opposite end engaging the other disk, a body of liquid in the tube and chamber common to each, a lever located opposite to the other disk, a connection between the last named disk and the lever, and a switch in connection with the lever.

2. In a thermostat, a pair of flexible disks connected to form an expansible chamber, a horizontally disposed tube closed at its outer end and having its inner end open and rigidly connected to one of the disks at the center of the latter so as to communicate with the chamber interior, a body of liquid in the tube and chamber with the surface of the liquid disposed below the top portions of the tube and chamber so as to permit of the formation of a vacuum in the tube and throughout the length thereof and in the chamber in the parts of the tube and chamber unoccupied by the liquid, whereby to normally hold the disks in compressed position, a switch, and a connection between the other disk and the switch.

In testimony whereof I have hereunto set my hand in the presence of two subscribing witnesses.

FREDERICK J. P. KUHLMANN.

Witnesses:
 JOHN H. HERRING,
 W. W. HEALEY.